Aug. 10, 1954 R. W. BRENNEMAN ET AL 2,685,936

SOUND REDUCTION EQUIPMENT FOR USE WITH JET-PROPULSION UNITS

Filed Aug. 8, 1950 7 Sheets-Sheet 1

INVENTORS
ROBERT W. BRENNEMAN
EDWIN JACOBSEN
RICHARD S. JACOBSEN

By George C. Sullivan
Agent

Aug. 10, 1954 R. W. BRENNEMAN ET AL 2,685,936
SOUND REDUCTION EQUIPMENT FOR USE
WITH JET-PROPULSION UNITS
Filed Aug. 8, 1950 7 Sheets-Sheet 2

INVENTORS
ROBERT W. BRENNEMAN
EDWIN JACOBSEN
RICHARD S. JACOBSEN

By George C. Sullivan
Agent

INVENTORS
ROBERT W. BRENNEMAN
EDWIN JACOBSEN
RICHARD S. JACOBSEN
By George A. Sullivan
Agent INVENTORS
ROBERT W. BRENNEMAN
EDWIN JACOBSEN
RICHARD S. JACOBSEN
By George A. Sullivan
Agent Aug. 10, 1954

R. W. BRENNEMAN ET AL

SOUND REDUCTION EQUIPMENT FOR USE WITH JET-PROPULSION UNITS 2,685,936

Filed Aug. 8, 1950

7 Sheets-Sheet 5

INVENTORS
ROBERT W. BRENNEMAN
EDWIN JACOBSEN
RICHARD S. JACOBSEN

By George Sullivan

Agent

Aug. 10, 1954

R. W. BRENNEMAN ET AL
SOUND REDUCTION EQUIPMENT FOR USE
WITH JET-PROPULSION UNITS 2,685,936

Filed Aug. 8, 1950

7 Sheets-Sheet 6

INVENTORS
ROBERT W. BRENNEMAN
EDWIN JACOBSEN
RICHARD S. JACOBSEN

By [signature]
Agent

INVENTORS
ROBERT W. BRENNEMAN
EDWIN JACOBSEN
RICHARD S. JACOBSEN
By George C. Sullivan
Agent Patented Aug. 10, 1954

2,685,936

UNITED STATES PATENT OFFICE 2,685,936

SOUND REDUCTION EQUIPMENT FOR USE WITH JET-PROPULSION UNITS

Robert W. Brenneman, Burbank, Edwin Jacobsen, Altadena, and Richard S. Jacobsen, Hollywood, Calif., assignors to Lockheed Aircraft Corporation, Burbank, Calif.

Application August 8, 1950, Serial No. 178,238

15 Claims. (Cl. 181—51)

This invention relates to devices for reducing sound and relates more particularly to devices and equipment for reducing the noise produced by reactive propulsive engines.

The reactive propulsion engine, such as a turbo jet, ram jet, and turbo propeller engine, produces tremendous noise. The frequency of the noises or sounds produced by an operating power plant of this class include the entire audible range as well as frequencies beyond the audible range, which latter are believed to have definitely injurious physiological effects. Operating such engines during the testing of the same and during other ground operations, creates serious occupational hazards and problems insofar as the personnel that are obliged to work in the vicinity of the engine, even though ear plugs and the like are employed and the exhaust jets are deflected upwardly by deflectors to reduce, to a minor extent, the excessive sound level. Furthermore, such engine operations become a public nuisance, disturbing residents, and others, even at remote points from the test area or the field where the engines and/or airplanes are tested. The advent of more powerful jet engines, afterburners for the engines, and multiple jet engined aircraft, have materially increased the seriousness of the situation and have made the solution of the problem more difficult and complex.

It is a general object of the present invention to provide practical and particularly effective equipment for markedly reducing the noise or sound level of jet engines during test operations, etc. The equipment of the invention is operable to reduce the noise accompanying operation of aircraft jet engines to the extent that the noise is tenable and substantially non-injurious to the workmen and other personnel in the immediate vicinity as well as to those residing and working at more distance points. The sound is reduced to be comparable with other permissible industrial noise, such as produced in manufacturing plants, etc.

It is another object of this invention to provide a device of this kind that is suitable for use with jet propelled aircraft being serviced and tested at airports, service fields, etc. In accordance with one embodiment of the invention the device is adjustable to assume the proper jet receiving position with relation to the airplane having the engine being tested. In another form of the invention a single apparatus or unit is adapted to simultaneously or successively receive the high velocity jets of hot gases from the engines of two or more airplanes, the unit being constructed so that a plurality of airplanes may be conveniently stationed about it to discharge their noise producing jets into the sound energy absorbing or dampening inlets of the device. In the various species of the invention the jet receiving inlets of the apparatus are designed to receive and seal about the tail pipe or jet portion of the airplane to markedly reduce the propagation of the low frequency sound from these regions and to confine the entire jet discharge within the sound reducing apparatus. The jet receiving inlet of the apparatus embodies an adaptor seal means that cooperates with the airplane and that is yieldingly urged in a manner to maintain sealing engagement with the airplane or the tail pipe portion of the engine without damage to the same during the relative movement between the airplane and the apparatus which, of necessity, accompanies engine operation.

A further object of the invention is to provide an apparatus of this class that does not interfere to any appreciable extent with normal jet engine operation during the running up and testing of the engine or engines. In engine testing and servicing operations it is important that the ambient pressure conditions at both the intake and the jet exhausting tail pipe or nozzle be comparable or at least simulate atmospheric conditions. For example, substantial resistance to air flow at the air intake of the engine, a negative pressure condition at the region of the jet exhaust, or substantial resistance to free discharge of the jet, will interfere with or affect normal engine operation and therefore make accurate testing of the engine difficult, if not impossible. In accordance with the invention, the sound reduction unit for the engine jet incorporates novel and effective means for maintaining substantially normal air pressure conditions at the region of the jet nozzle and the sound energy and velocity energy absorbing means and the heat reducing means are constructed and related to offer the minimum of back pressure consistent with their functions. In a like fashion, the air inlet sound reduction unit does not materially interfere with the free reception of air by the engine.

A still further object of the invention is to provide apparatus of the character described, characterized by a simple, yet effective means for reducing the temperature of the hot gases of the engine jet, reducing the sound energy of the jet and reducing the velocity of the jet stream, these means being contained in a relatively small unit and being constructed and related to function most efficiently.

Other objectives and features of the invention will become apparent from the following detailed description of typical preferred embodiments throughout which description reference is made to the accompanying drawings wherein.

Figures 1, 2A:
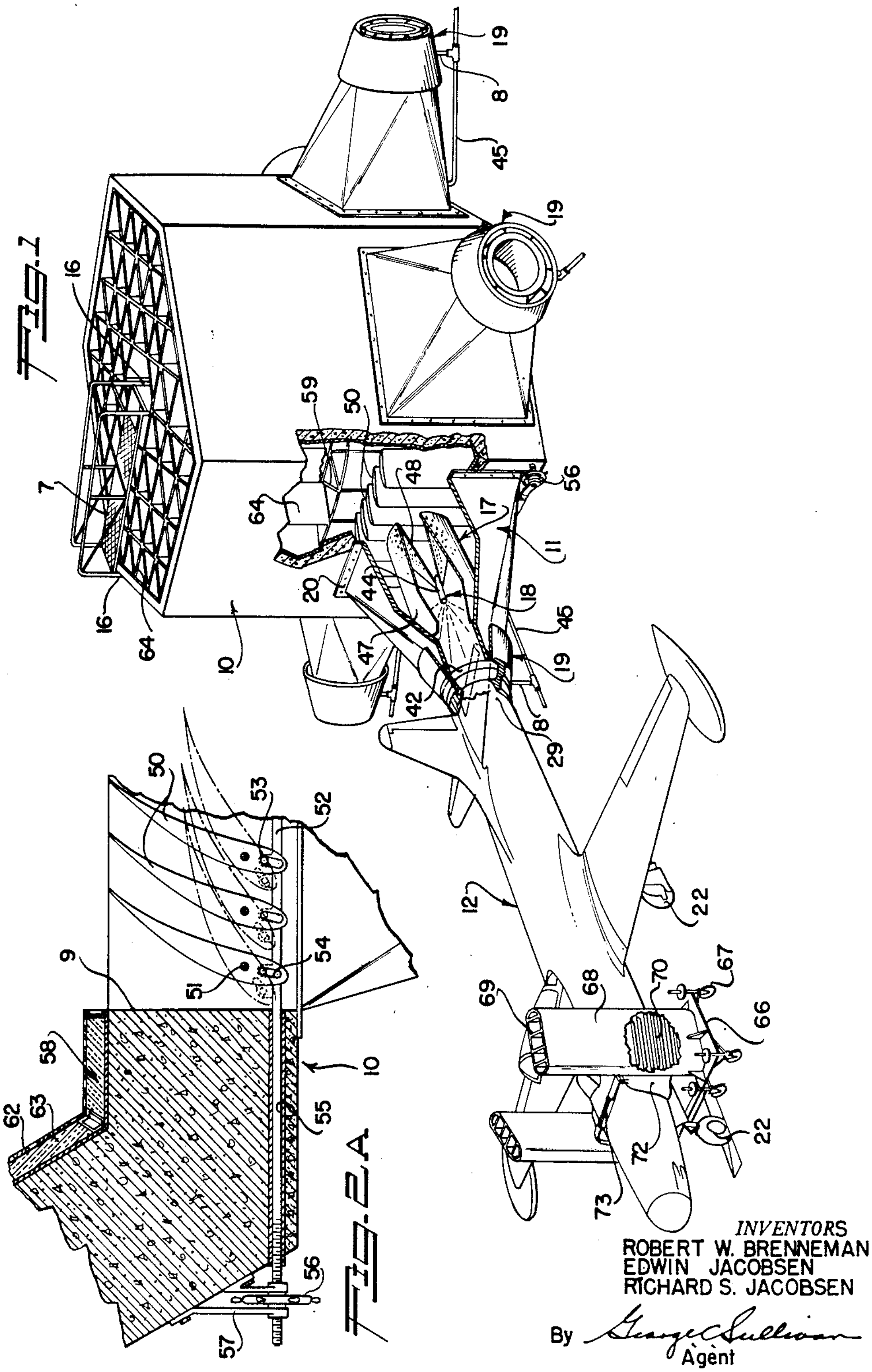
Figure 1 is a perspective view of the multiple jet-inlet type of apparatus illustrating an airplane in association therewith, with certain portions broken away to illustrate the interior of the apparatus.
Figure 2A is an enlarged horizontal detailed sectional view of a portion of the device illustrated in Figure 1, with the full lines indicating the normal or open positions of the direction changing vanes and the broken lines indicating the closed positions of the vanes.

The sound reduction equipment of the invention is capable of reducing the noises created by aircraft jet propulsion engines of various rating and kinds as well as by other analagous devices and the equipment may be modified or constructed for use with specific jet powerplants and the like. The apparatus is particularly well suited for reducing the noises resulting from the operation of jet engines installed or incorporated in completed aircraft and in the drawings there are illustrated typical embodiments intended for such use and which will be hereinafter described. It is to be understood that these are merely preferred illustrative examples and they are not to be construed as limiting or restricting either the scope or application of the invention.

The equipment illustrated in Figures 1 to 7 inclusive, is adapted to receive the high velocity jets of high temperature gases and air from the powerplants of one, two, or more airplanes either operating separately or simultaneously. The device of Figures 1 to 7 inclusive includes a central or main structure 10 in the nature of a sound reduction chamber and stack adapted to receive the hot noise creating jets from a plurality of inlet sections or tubes 11 which, in turn, may directly receive the engine jets from the airplanes 12. The configuration of the stack structure 10 may depend to some extent at least upon the number of inlet tubes 11 to be employed. The structure 10 is a vertical element open at its upper end for the final discharge or exhaust of the gases and air from the airplane engine or engines and where there are six inlet sections or tubes 11, as illustrated, the structure 10 is hexagonal so that a tube 11 may extend from each of its sides, it being apparent that the structure 10 may be round, square, octagonal, etc. in configuration. In the drawings, the stack structure 10 is shown to be constructed of concrete, it being contemplated that it may be of metal, if desired. A lower wall 13 extends across the bottom of the structure 10 at or adjacent the ground level, and includes a suitable footing or foundation 14 and a central sump 15 for the purpose to be later described. A service ladder 16 is provided for the stack side and has a walkway 7 extending partially across the top of the stack structure 10. Each vertical side of the structure 10 has an opening 9 of substantial size for receiving the gases of the engine jets from the inlet sections or tubes 11. The interior of the structure or stack 10 is provided with sound reduction means which will be later described, following a description of the inlet tubes 11 and the associated equipment. By reason of the effectiveness of the sound reduction means incorporated in the inlet tubes 11 and provided within the stack section 10, the section 10 may be relatively short or of limited height, as illustrated.

The inlet sections or tubes 11 may be identical and we will proceed with a detailed description of one of them, such description being equally applicable to the others, it being understood that the inlet tubes may be modified or equipped to cooperate with airplanes and/or engines of different sizes, types, etc. Each inlet section 11 is in the nature of an expansion tube and houses, or contains, velocity reduction or dissipating means 17, water spray means 18 for cooling the gases and for assisting in reducing the noise, and has an adaptor means 19 for sealing and cooperating with the airplane 12 or its engine.

The forward or outer end of the inlet tube 11 is round or annular in cross section and flares rearwardly or toward the stack 10. This round flaring forward portion merges with a square or rectangular flaring portion which has a flange 20 at its edge that is fixed to the wall of the stack section 10. The central longitudinal axis of the inlet tube 11 is substantially horizontal and at right angles to a side of the polygonal stack 10. The rearwardly flaring inlet tube 11 is secured to the stack 10 to register with the opening 9 in the companion side of the stack 10 so that the jet gases discharge directly into the stack from the inlet tube. The above-mentioned adaptor means 19 comprises a collar unit located at the forward or inlet end of the tube 11 and adapted to engage about the aft end of the airplane fuselage 29 as illustrated in Figure 1, or the aft end of an airplane nacelle or about the discharge nozzle or tail pipe portion of the airplane jet engine. A substantial portion of the low frequency noise created by a jet engine is the result of the extensive air turbulence and buffeting that occurs immediately at the exhaust end of the jet tube or tail pipe of the engine. The adaptor means 19 is provided to confine the noise creating jet blast at the region where it issues from the tail pipe of the engine and thus obtain a marked reduction in the noise or sound. Even though the landing wheels 22 of the airplane 12 may be braked and/or chocked the variable thrust effect of the jet engine being tested or run-up will produce relative movement between the airplane 12 and the inlet tube 11 and the adaptor means 19 must be capable of permitting such motion and yet remain in the operative position.

Figures 4, 5, 6:
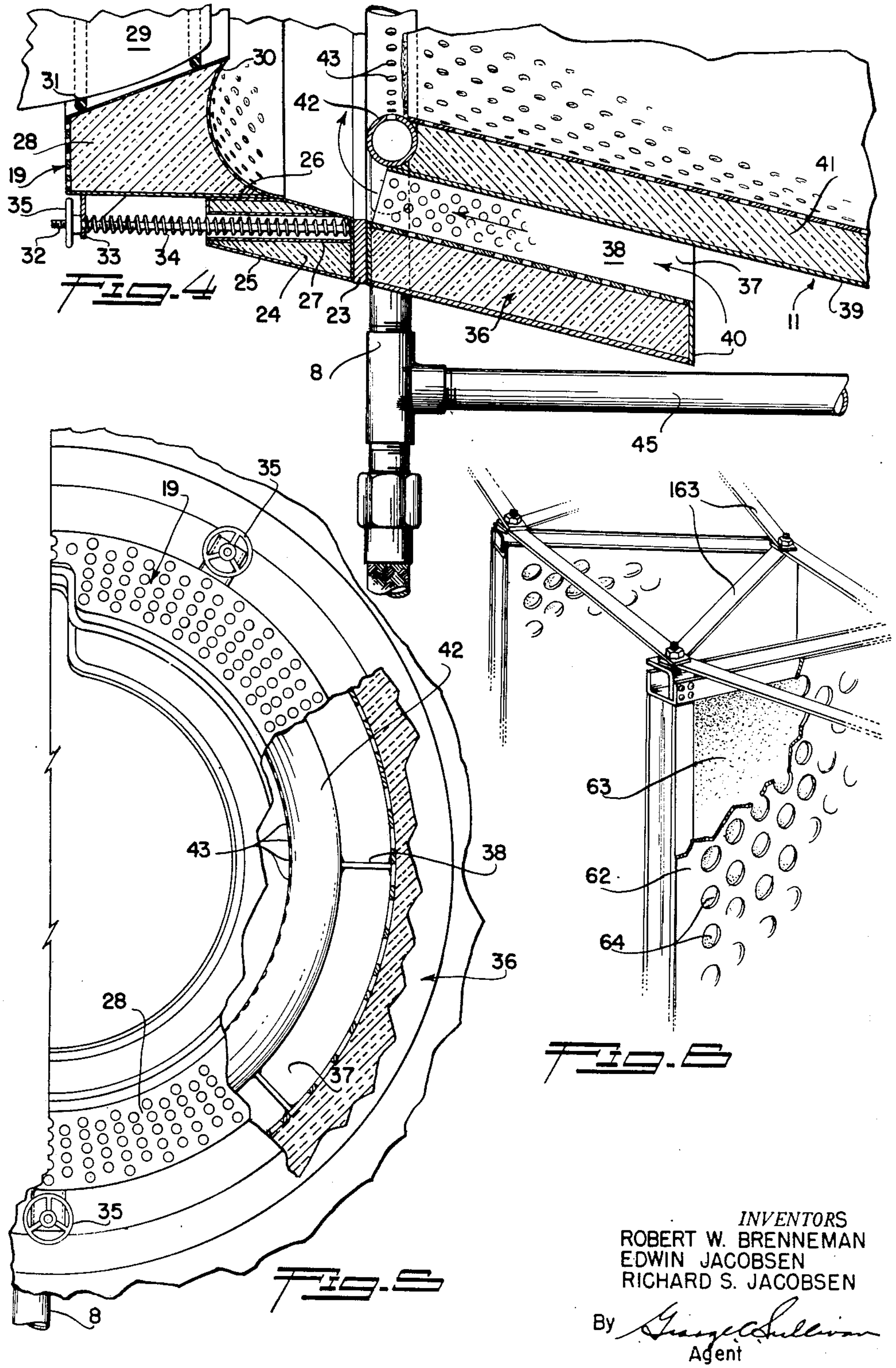
Figure 4 is an enlarged fragmentary vertical sectional view of an adaptor and inlet portion illustrating the manner in which atmospheric or outside air is admitted to the inlet of the apparatus.
Figure 5 is an enlarged fragmentary front elevation of the inlet-adaptor portion with a part broken away.
Figure 6 is a fragmentary perspective view of certain of the sound energy absorbing panels within the unit and the manner of securing the same.

The forward portion of the inlet tube 11 is provided with a mounting or attachment ring 23, best illustrated in Figure 4, and a tubular member 24 is secured to and extends forwardly from the ring. The member 24 is a sound energy absorbing part comprising a shell 25 of metal packed or filled with glass-wool, metal-wool, fibrous asbestos, or the like. The shell 25 of the member 24 prevents a cylindrical internal surface 26 and has two or more circumferentially spaced axially extending openings or tubes 27. The adaptor means 19 further includes a collar 28 slidable or movable on the cylindrical surface 26 and designed to engage or fit about the aft portion 29 of the airplane fuselage. The collar 28 is generally annular in shape and may be designed to conform with the particular fuselage portion 29. The collar 28 comprises a body or blanket of heat resistant sound energy absorbing material such as glass-wool, fibrous asbestos, metal-wool, or the like, enclosed in a metal shell 30. The forward and rear walls of the shell 30 are preferably perforated, as illustrated. The peripheral surface of the collar 28 is cylindrical to ride on the surface 26 of the ring 24 and in the particular case illustrated the internal surface of the collar 28 is rearwardly convergent to conform generally with the aft portion 29 of the fuselage. Spaced seal rings 31 are engaged between the inner surface of the collar 28 and the fuselage portion 29 and are such as to maintain a seal during engine operation.

Regulable spring means is provided to hold or urge the collar 28 forwardly to maintain proper sealing engagement with the fuselage portion 29. Stems or rods 32 are fixed to the mounting ring 23 of the inlet section and extend forwardly through the tubes 27 and through openings in lugs 33 which project from the collar 28. Springs 34 surround the rods 32 and are engaged under compression between the ring 23 and the lugs 33 to urge the collar 28 forwardly and thus maintain proper sealing engagement of the rings 31 with the fuselage portion 29 and the internal surface of the collar 28. Nuts or wheels 35 are threaded on the forward end portions of the rods 32 and cooperate with the lugs 33 to adjust the compression of the springs 34 and to initially position the collar 28, as required. It is believed that it will be apparent how the spring urged collar 28 is free to slide on the surface 26 upon relative movement between the airplane 12 and the inlet tube 11 when the jet engine is being tested or run up. The inner or rear end of the movable collar 28 is preferably concave, as illustrated in Figure 4, for the reason that will subsequently be described.

It is desirable to admit atmospheric air to the outer or forward end of the inlet section or tube 11 to commingle with the gases and air of the high temperature engine jet to assist in cooling the jet and to bring the pressure condition within the inlet section more nearly comparable to the pressure conditions that exist when the engine jet is exhausted directly into the atmosphere. Accordingly, we have provided what may be termed an augmenter 36 at the forward end of the inlet section 11. The augmenter 36 is a tubular or annular member surrounding the forward part of the inlet tube 11 in spaced concentric relation thereto, leaving an annular air passage 37. The forward end of the augmenter 36 may serve to carry the above-described mounting ring 23 and the augmenter may, in turn, be supported from the inlet tube 11 by circumferentially spaced flanges or ribs 38, as illustrated in Figures 4 and 5. Both the walls of the tubular inlet section or tube 11 and of the augmenter 36 are preferably constructed to be effective in absorbing sound energy. Thus, as illustrated in Figure 4, the tube 11 and the augmenter 36 comprise shells 39 and 40 respectively, of appropriate metal packed with glass-wool, metal-wool, fibrous asbestos, or the like, 41. The inner walls of the shells 39 and 40 are preferably perforated to better expose the absorbent material 41 to the sound energy.

The abovementioned passage 37 between the inlet tube 11 and the augmenter 36 has its outer or rear end open to the atmosphere to receive air and its inner end is open to the forward end of the inlet tube 11. The forward extremity of the inlet tube 11 is spaced from the inner end of the collar 28 leaving a large exit for the passage 37 and the inner wall of the collar 28 is made concave, as above described, so that the air flowing inwardly through the augmenter passage may make a smooth turn into the inlet tube 11. The arrows in Figure 4 illustrate the manner in which air is induced or drawn inwardly through the augmenter passage 37 and into the inlet tube 11 by the high velocity engine jet discharging centrally or coaxially through the tube 11. The air admitted by the annular passage 37 in addition to mingling with the hot gases of the jet to cool the same, provides or forms a boundary layer of relatively cool air which flows rearwardly along the inner surface of the inlet tube 11 to protect the same against the high temperature jet. Further, as mentioned above, the large capacity annular augmenter passage 37, by placing the inlet end of the tube 11 in communication with the atmosphere, brings the pressure in the inlet tube and at the exhaust end of the engine tail pipe more nearly like the pressure that would exist if the engine jet were permitted to discharge directly into the atmosphere.

The means 18 is provided to introduce or spray water under pressure into the high temperature engine jet flowing rearwardly through the expanding inlet section or tube 11 to cool the jet, the water also serving to assist in reducing the passage of sound energy outward through the sound reducing equipment. It has been found desirable to inject water streams into the expansion tube or inlet section 11 at two spaced regions, namely at the forward extremity of the tube and substantially midway between the ends of the tube. An annular spray manifold 42 is provided at the forward end of the inlet tube 11 and is supplied with the water under pressure by a pipe 8. In this particular embodiment of the invention the annular manifold 42 is partially recessed in the forward edge of the section or tube 11 and has a plurality of circumferentially spaced orifices or ports 43 directed radially inward. The water issuing from the many ports 43 under substantial pressure may partially enter the high velocity engine jet and, of course, is carried rearwardly by the jet. The water, which is broken into drops and droplets by the force of the engine jet, has a cooling effect upon the hot jet and is carried rearwardly to cooperate with the velocity absorbing means 17, as will be later described. The water injecting means 18 further includes a centrally positioned water injecting nozzle 44 located substantially midway between the ends of the inlet section 11 and directed forwardly or toward the airplane 12. A branch 45 of the pipe 8 supplies the water under pressure to the nozzle 44 and the nozzle is preferably such that it discharges a substantial volume of water forwardly into the expanding engine jet in the form of a plurality of forwardly diverging streams. The nozzle 44 may be carried by the means 17, described below, and the water from the nozzle further cools the engine jet by evaporation and cooperates with the means 17 in reducing the rearward passage of the sound energy. Some of the water introduced into the inlet tube 11 by the means 18 is carried rearwardly by the engine jet to enter the stack structure 10 where it is received by the sump 15 and carried away by a suitable drain 46.

The means 17 is provided within the expanding inlet tube 11 to dissipate the velocity energy of the engine jet, to present large surface areas which are wet by the water introduced as above described, and to serve as a barrier to reduce the passage of the low frequency long wave length sound rearwardly into the stack structure 10. The means 17 includes a tubular element 47 of frusto conical configuration arranged coaxially in the inlet tube 11 with its small diametered end at or adjacent the related opening 9 of the stack 10 and a re-entrant hollow cone 48 extending forwardly from the rear edge of the element 47. The element 47 and the cone 48 are preferably formed of heavy gauge steel and are perforated throughout to have substantially fifty percent of their areas open for the passage of the jet gases. As illustrated in Figure 1, the above described water nozzle 44 is fixed in the forward end or apex of the cone 48. It will be seen that the frusto conical element 47 and the cone 48 present extensive surfaces within the expanding tube 11 to break up the engine jet stream and to be wet by the water droplets from the water injecting means 18. The water constantly supplied to these extensive surfaces cools the jet by evaporation and the wet surfaces in the path of the jet stream materially reduce the velocity of the stream and constitute a barrier which reduces the rearward passage of the low frequency sound energy.

The central structure or stack 10 contains an assembly of sound absorbing elements constructed and related to be particularly effective in absorbing the sound of the engine jet or jets. Each opening 9 of the structure 10 is equipped with direction changing vanes 50, designed and arranged to give the streams of the engine gases an angular or spiral path as they enter the stack. The direction changing vanes 50 are substantially airfoil shaped and are arranged vertically in the openings 9. The vanes 50 of the several openings 9 are pitched or directed in the same direction, for example to the right, so that the cooled engine gases are made to turn or spiral as they enter the stack structure 10. It is preferred to arrange the vanes 50 so that the vanes at a given opening 9 may be moved to positions to close off that opening when the inlet tube 11 of that opening is not in use and one or more jets are being received at other inlet tubes 11. The vanes 50 are supported by vertical pivots 51 spaced rearwardly from their leading edges. An axially movable adjusting rod 52 extends through each opening 9 at an end of series of vanes 50 and each rod carries pins 53 which cooperate with slots 54 in the adjacent ends of the vanes 50. The rods 52 pass through openings 55 in the walls of the stack structure 10 and are actuated or moved by nuts or wheels 56 threaded on the rods and confined between fixed stops 57. The hand wheels 56 are located at the exterior of the structure 10 to be conveniently accessible for manual operation. When it is desired to close off an opening 9 the related hand wheel 56 is turned to move the rod 52 axially and thus pivot the related vanes 50 to the broken line positions of Figure 2A where they substantially completely close off the opening 9. When the engine or engines of an airplane 12 are to be run up or tested at the related inlet tube 11 the hand wheel 56 is rotated in the opposite direction to return the directing changing vanes 50 to their open full-line positions of Figure 2A.

Figures 2, 3:
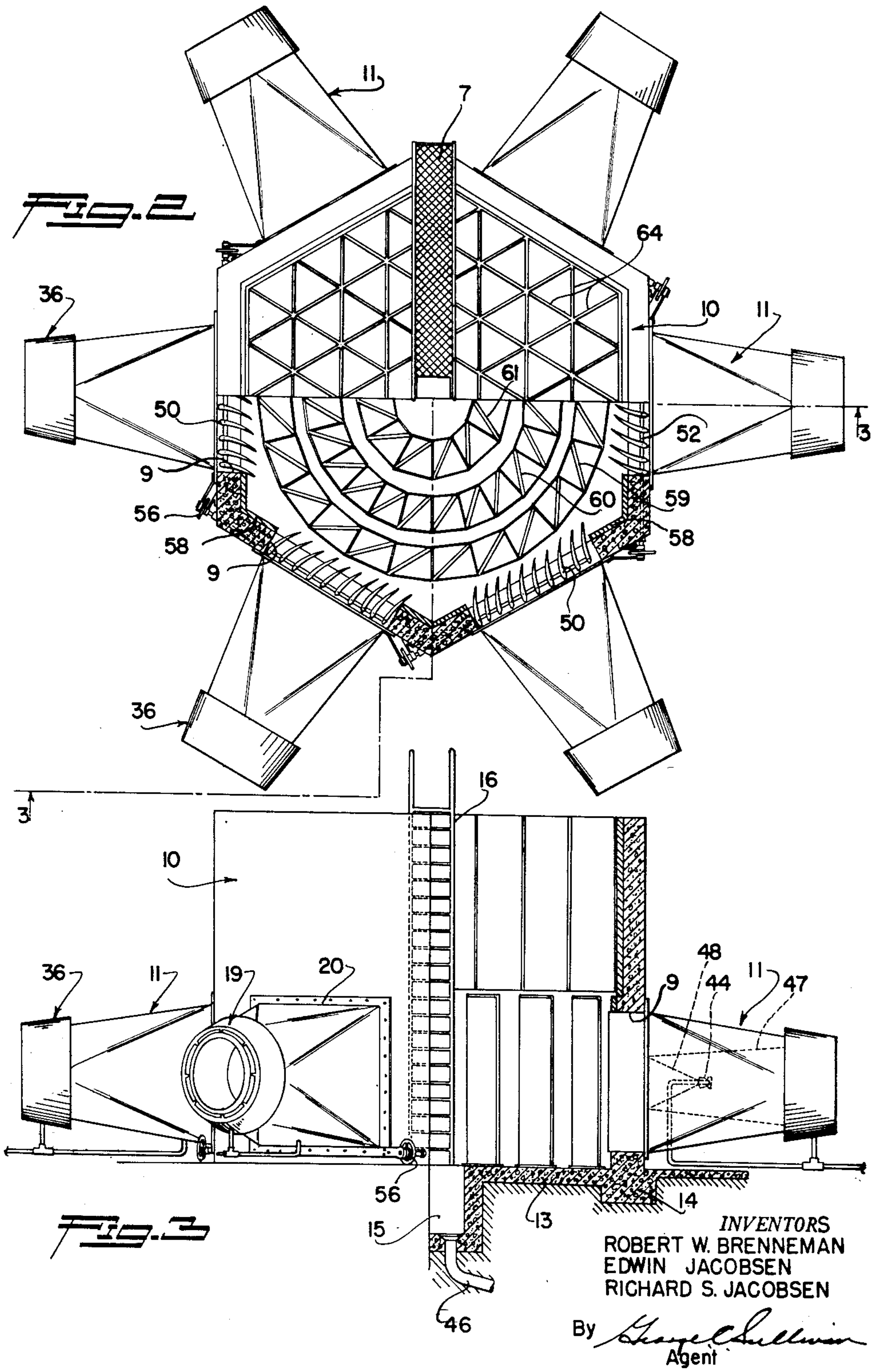
Figure 2 is an enlarged top or plan view of the apparatus illustrated in Figure 1, with a portion appearing in horizontal cross section.
Figure 3 is a view taken substantially as indicated by lines 3—3 on Figure 2 illustrating a portion of the apparatus in side elevation and another portion in vertical cross section.

The inner wall or surface of the stack structure 10 is covered or provided with sound absorbing panels 58 and three circular series of sound absorbing panels 59, 60 and 61 are arranged within the stack. These panels 58, 59, 60 and 61, may be of the same construction and each includes a metal shell 62 and a blanket or internal filler 63 of glass-wool, metal-wool, fibrous asbestos, or the like. The shells 62 are provided with perforations 64 for the admission of the sound energy. The structure of the sound absorbing panels is illustrated in Figure 6. The annular or circular series of sound absorbing panels 59, 60 and 61, are arranged and related to reflect, intersect and absorb the reflecting sound waves most efficiently and to direct the engine jet gas stream or streams in a spiral path for upward passage from the stack 10. The panels 59, 60 and 61 are tangent to circles concentric with the central vertical axis of the stack 10; the panels of the outer series 59 being tangent to a relatively large circle, the panels 60 being tangent to a smaller circle and the panels of the inner series 61 being tangent to a quite small circle with all of the panels being arranged vertically and being pitched in the same general direction as the above described admission direction changing vanes 50. This relationship of the panels, which is illustrated in Figure 2, not only directs the engine jet gases in a spiral path for discharge upwardly in the central area of the stack 10 but also presents a large number of sound reflecting and sound absorbing surfaces or elements at different angles to be particularly efficient in repeatedly reflecting the sound energy and in absorbing the energy thus reflected. The panels 59, 60 and 61 of the plurality of circular series, are secured to and supported by a suitable framework 163 of rods and ties, as illustrated in Figure 6.

The upper portion of the stack structure 10 is provided with a series of sound absorbing panels 64 to absorb a substantial portion of the residual sound escaping from the stack. These panels 64, which may be of the same construction as the panels 58 to 61, are positioned vertically in the stack and are arranged in a honeycomb relationship. This is clearly illustrated in Figures 1 and 2. As the panels 64 are set at different angles than the panels 59, 60 and 61, they are effective in redirecting or reflecting the sound energy from one to the other and, therefore, absorb a large proportion of the residual sound.

Figures 7, 8, 9, 10:
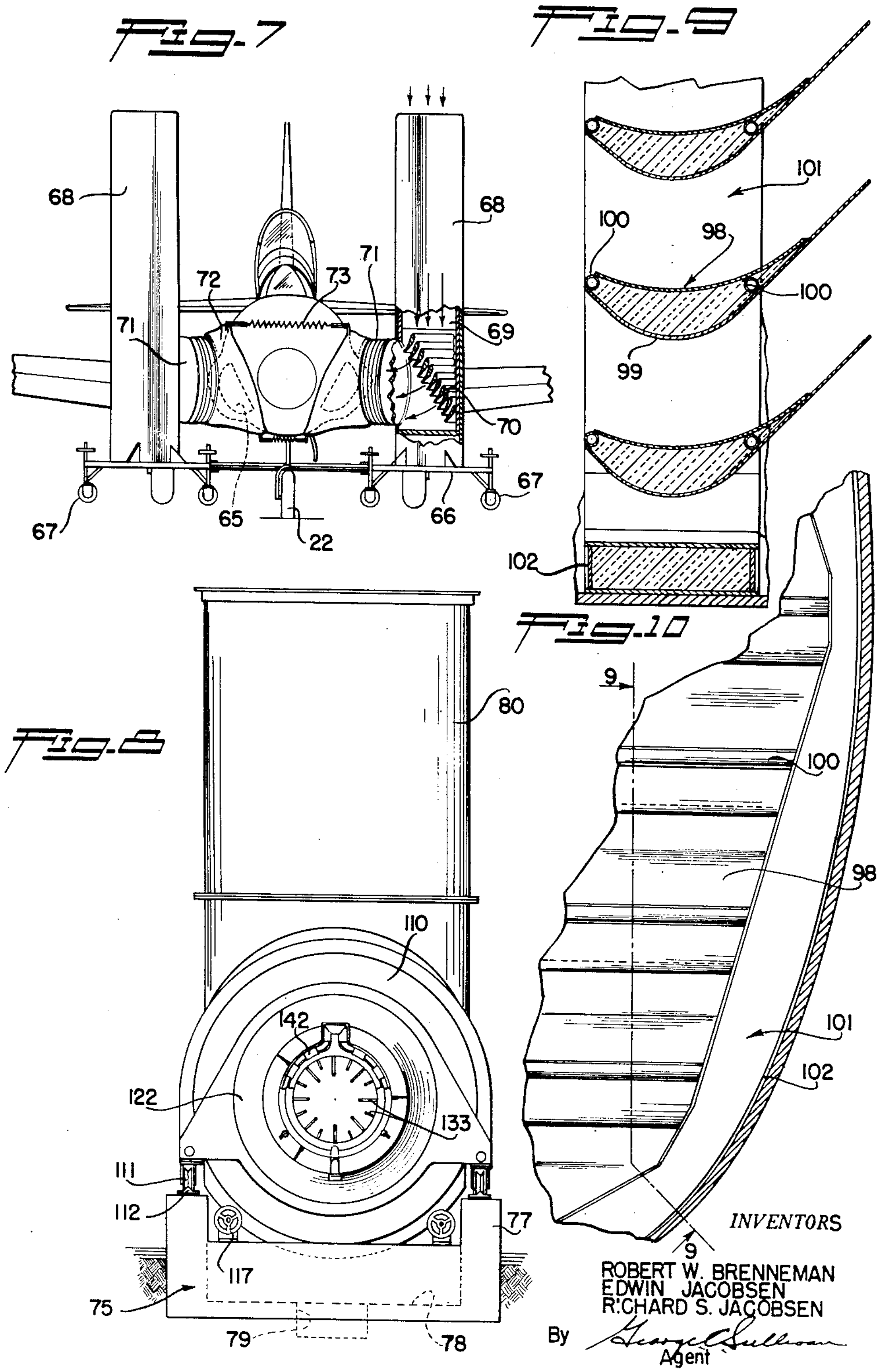
Figure 7 is a front elevation of the airplane illustrating the air inlet sound reducing units with a portion of one of the units broken away to appear in vertical cross section.
Figure 8 is a front elevation of another form of the invention.
Figure 9 is an enlarged sectional fragmentary view of the direction changing vanes of the apparatus illustrated in Figure 8, being a view taken substantially as indicated by line 9—9 on Figure 10.
Figure 10 is a fragmentary front elevation of the direction changing vanes with the adjacent structure in vertical cross section.
Figures 11, 11A, 12:
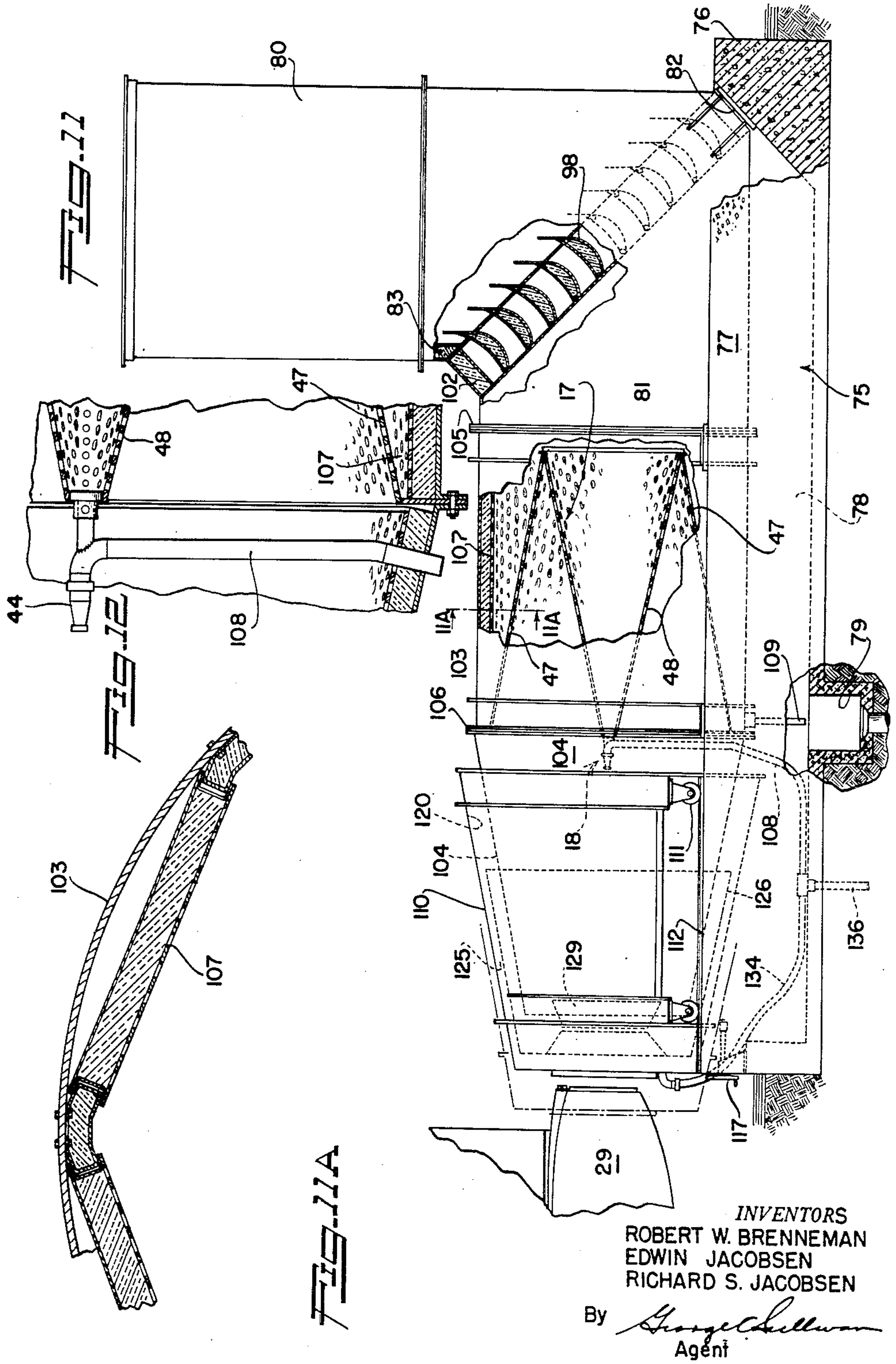
Figure 11 is a side elevation of the sound reducing unit illustrated in Figure 8 with portions broken away to illustrate certain internal parts in vertical cross section.
Figure 11A is a fragmentary sectional view taken as indicated by line 11A—11A on Figure 11.
Figure 12 is an enlarged fragmentary vertical sectional view illustrating the central spray nozzle of the device illustrated in Figure 8.

In most instances it may be desirable to absorb the high frequency sound created at the engine-air intake openings 65 of the aircraft 12. In Figures 1 and 7, we have shown sound absorbing units for this purpose, each unit including a carriage 66 supported by vertically adjustable wheel 67. Vertically disposed intake tubes 68 are mounted on the carriages 66 and their upper ends are open for the reception of air. Sound absorbing panels 69 line the tubes 68 and are arranged transversely in the tubes. The lower portions of the air intake tubes 68 have direction changing vanes 70 for directing the incoming air into lateral tubular arms or flanges 71. Adaptor pads 72 on the flanges 71 are designed to conform with the contour of the airplane 12 around the air intake openings 65. Suitable tie straps 73 extend between and connect the pads 72 to hold them in position. The arrows in Figure 7 illustrate the manner in which air flows through the tubes 68 into the air receiving openings 65 of the aircraft, the sound produced at the openings and by the compressors of the engines being effectively absorbed by the panels 69.

Figure 13:
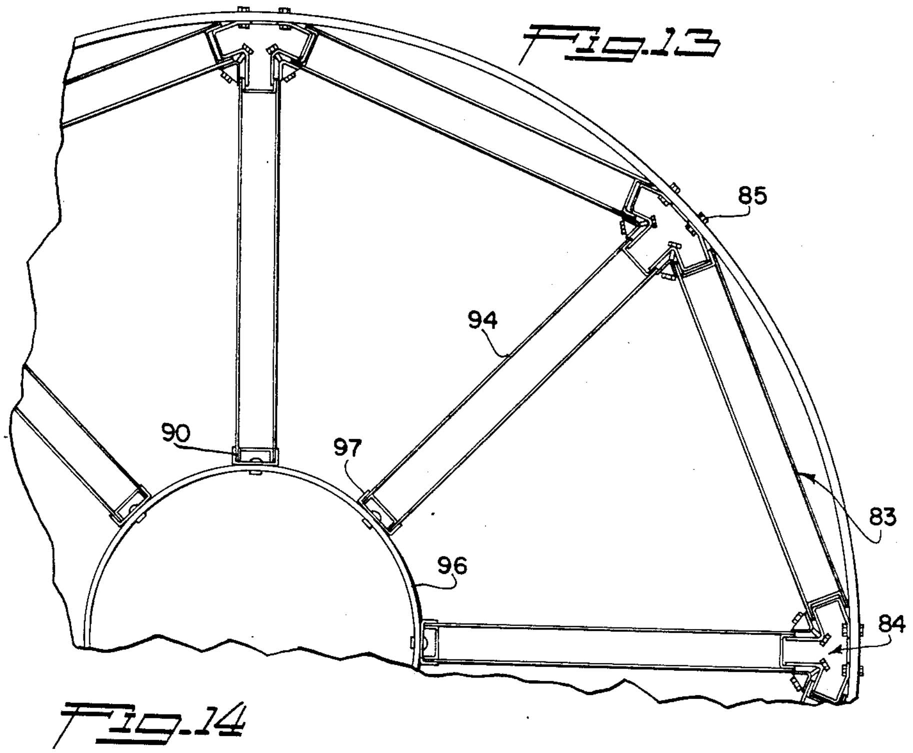
Figure 13 is an enlarged fragmentary top view of the stack portion of the device illustrated in Figure 8.
Figures 14, 15:
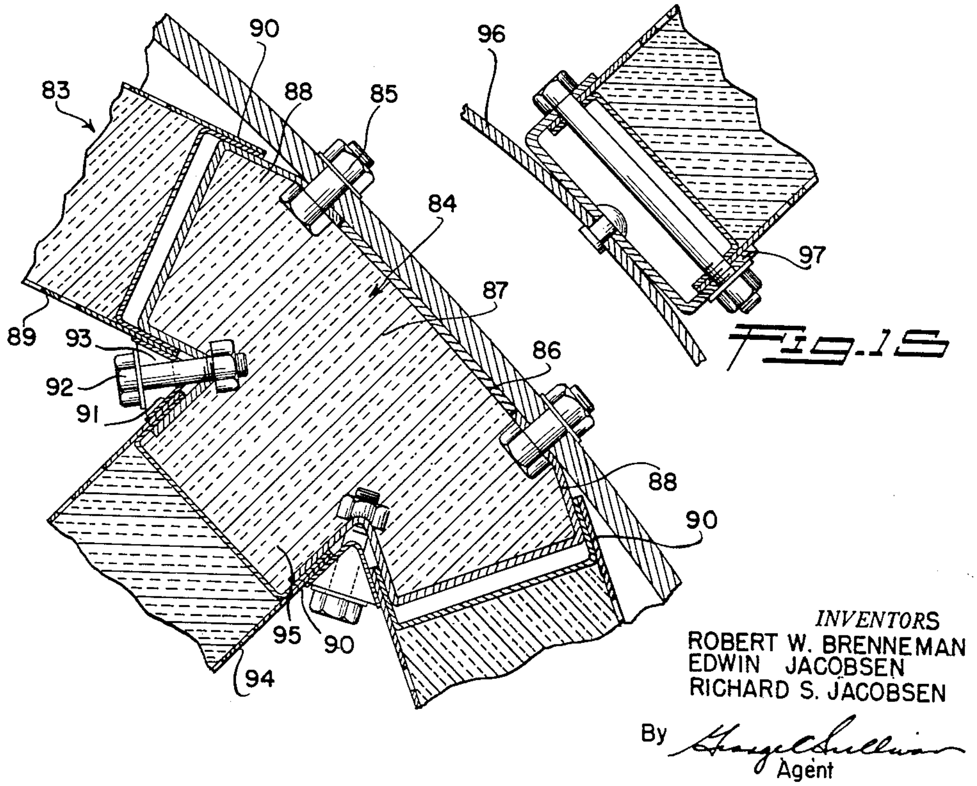
Figure 14 is an enlarged fragmentary horizontal sectional view illustrating the manner of mounting or attaching the panels shown in Figure 13.
Figure 15 is an enlarged horizontal detailed sectional view of the means for securing the inner edge portion of one of said panels.

Figures 8 to 18 inclusive, illustrate another form of the invention adapted for use with a single jet propelled airplane, that is with individual jet discharging nozzles or tail pipes. This equipment includes a bed 75, of concrete, or the like, provided at its rear end with a thrust receiving abutment 76 and provided with spaced raised sidewalls 77. The major portion of the bed 75 is depressed to leave a well 78 and a sump 79 is provided at the bottom of the well. A vertical stack 80 rises from a horizontal tube 81 which is secured in the bed 75, the lower section of the stack and the tube forming a right angle elbow. The assembly of the tube 81 and the stack 80 has a thrust plate 82 at its lower corner of joinder bearing on and secured to the abutment wall 76 for assisting in transmitting the thrust of the engine jet to the bed 75. While we have shown the stack 80 and tube 81 to be cylindrical, it will be apparent that they may be square, rectangular, hexagonal, or of other configurations. In accordance with the invention the stack 80 and the tube 81 are lined with sound absorbing panels 83 of the same construction as the panels 58—61 described above. These panels 83 are flat and are arranged in chord-like fashion against the inner walls of the cylindrical stack 80 and tube 81, as illustrated in Figure 13. Spaced securing or mounting members 84 extend axially along the interiors of the stack and tube to secure the edges of the panels 83. These members 84, which are best illustrated in Figures 13 and 14, are bolted to the stack 80 and tube 81 at 85 and comprise shells 86 of metal and filling material 87 of glass-wool, metal-wool, fibrous asbestos, or the like. Each member 84 has two edge extensions or flanges 88 and the metal shells 89 of the sound absorbing panels 83 have flanges or lips 90 which engage the opposite sides of the flanges 88, the flanges being received between the spaced lips 90, as best shown in Figure 14. Clamps 91 are engaged against the inner lips 90 and are urged inwardly against the lips by bolts 92 carried by the panels 83 and acting against blocks 93 fitting the clips. This construction securely holds the sound absorbing panels 83 in place and yet permits ready replacement of the panels.

The stack 80 is further provided with radially disposed sound absorbing panels 94. These panels 94 are of the same construction as the panels 59—61 and are arranged vertically in the stack to extend radially inward from the panel mounting members 84. The members 84, that are secured within the stack 80, have vertically extending inwardly projecting extensions 95 and the edge lips 90 of the panels 94 engage at each side of the extensions. As shown in Figure 14, the clamps 91 and clamp bolts 92, clamp the lips 90 against the extensions 95 to secure the inner edges of the panels 94 to the mounting members 84. Vertically spaced rings 96 are arranged at the inner edges of the panels 94 and carry brackets or clips 97 which receive and are bolted to the inner edge lips 90 of the panels 94 to retain the inner margins of the panels. The horizontal tube 81 need not be provided with radially disposed sound absorbing panels 94 and the panel mounting members 84 of the tube may or may not have the extensions 95.

It is preferred to provide turning vanes or direction changing vanes 98 at the juncture of the tube 81 and the stack 80 to direct the jet gases upwardly into the stack. The vanes 98 comprise shells 99 occupied by glass-wool, metal-wool, fibrous asbestos, or the like, and are positioned horizontally across the gas passage. The vanes 98 are carried by rods or tubes 100 which may extend through them from end to end and the protruding end portions of the tubes 100 are welded or otherwise secured to a corner ring or fitting 101. This fitting 101 also includes a shell 102 of metal and a filling of glass-wool, metal-wool, asbestos, or the like, and is of special configuration to occupy the juncture of the stack 80 and the tube 81.

The jet inlet tube of this form of the invention comprises a rear tube section 103 connected with the above described tube 81 and a forward section 104 provided with augmenter or adaptor means for cooperating with the aft portion 29 of the airplane 12. The tube section 103 may be a cylindrical tubular member secured to the tube 81 at flanges 105 and extends horizontally forward. However, the forward section 104 of the inlet tube is an expander tube for the engine jet and flares rearwardly from its forward end to its point or plane of connection 106 with the tube section 103. The two sections 103 and 104 are lined with sound absorbing panels 107 which may be the same as the panels 83 described above and may be secured or mounted in the same manner as the panels 83.

The inlet tube section 103 contains the velocity energy dissipating means 17 which may be the same as the means 17 described above and therefore corresponding reference numerals are applied to its several parts. The tubular perforated frusto conical element 47 of the means 17 extends rearwardly from the front end of the section 103 to adjacent its rear end and the perforated hollow cone 48 extends forwardly within the element 47 to the section 104. The above described water injecting nozzle 44 is secured in the forward end of the cone 48 to discharge the water forwardly into the high temperature engine jet. A pipe 108 supplies water to the nozzle 44 and the inlet tube section 103 has a drain 109 for carrying the excess water from the equipment into the sump 79.

The equipment illustrated in Figures 8 to 18 inclusive, has a movable augmenter or atmospheric air admitting means 110 associated with the forward inlet section 104 and an adaptor on the augmenter for cooperating with the tail pipe or fuselage 29 of the airplane 12. The augmenter 110 is a tubular flaring or frusto conical member arranged around the forward inlet tube section 104. In this form of the invention the augmenter 110 is movable or adjustable axially of the jet inlet, being carried by grooved wheels or rollers 111 which ride on V tracks 112 on the side walls 77 of the bed 75. The means for shifting or adjusting the augmenter 110 includes screws 113 rotatably carried yet restrained against axial movement in brackets 114 on the bed 75. The screws 113 are threaded through nuts 115 fixed to lugs 116 on the lower side of the augmenter 110 and the screws have operating handles or wheels 117 on their forward ends.

Figures 16, 17, 18:
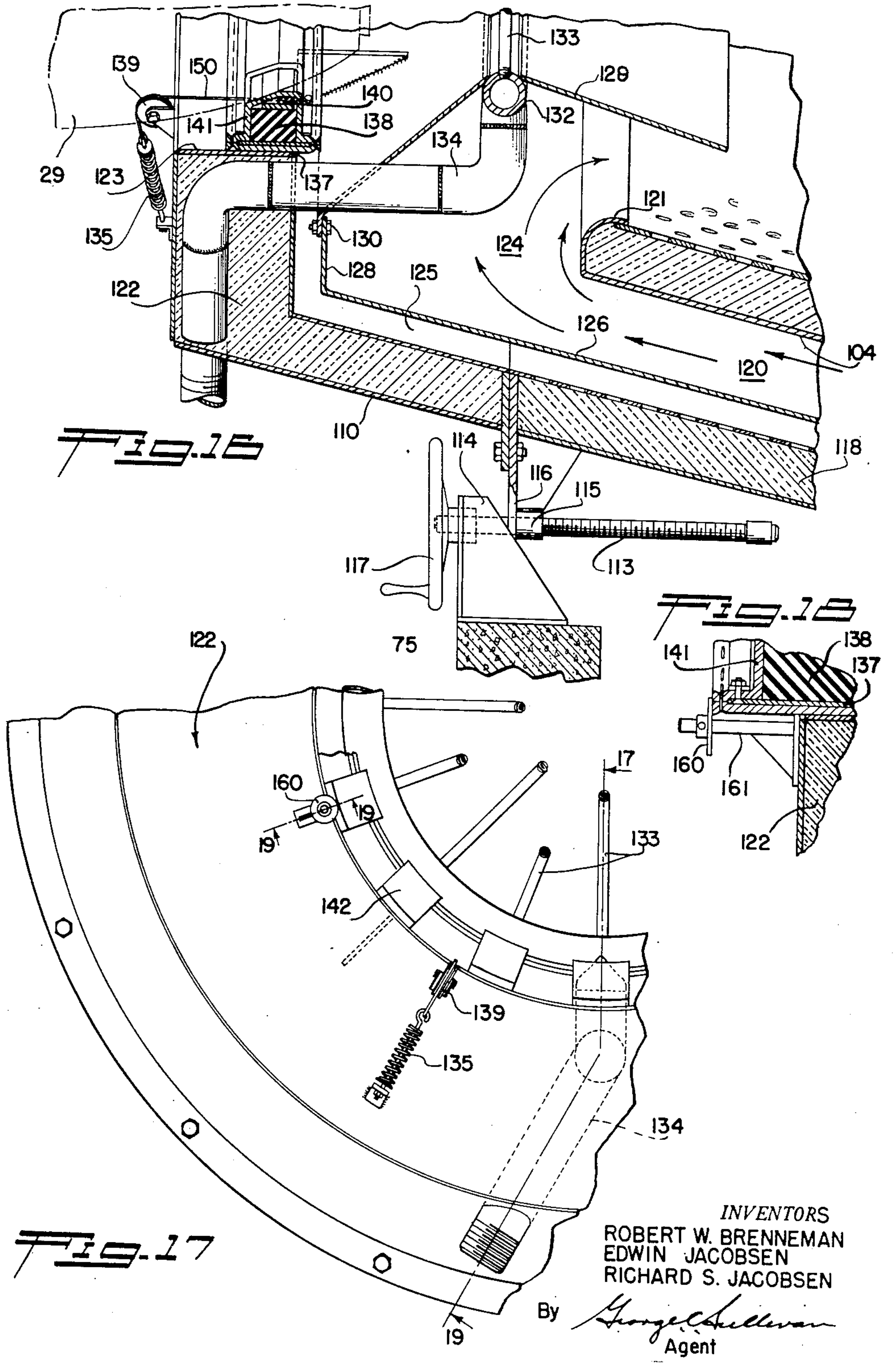
Figure 16 is an enlarged fragmentary vertical detailed sectional view of the inlet or adaptor portion of the sound reducing device illustrated in Figure 8.
Figure 17 is an enlarged fragmentary front elevation of the inlet or adaptor portion.
Figure 18 is a fragmentary sectional view on an enlarged scale taken substantially as indicated by line 18—18 on Figure 17.

The augmenter 110 is lined with sound absorbing panels 118 which may be of the same construction as the above described panels 83. As best illustrated in Figure 16, the augmenter 110 is spaced around the forward portion of the inlet section 104 to leave an annular air induction passage or augmenter passage 120. The wall of the augmenter 110 is substantially parallel with the wall of the tube section 104 so that the passage 120 is of substantially uniform width or capacity. The forward end 121 of the inlet tube section 104 is spaced rearwardly some distance from the forward end of the augmenter 110 and is rolled or turned inwardly. The forward end of the augmenter 110 has an inturned substantially radial flange or wall 122 presenting a cylindrical internal surface 123 which has a diameter considerably larger than the diameter of the aft portion 29 of the airplane tail pipe or fuselage. The forward end 121 of the inlet section 104 and the forward wall 122 of the augmenter are spaced a considerable distance apart, leaving an annular exit 124 for the augmenter passage 120, this exit placing the passage in communication with the jet receiving interior of the inlet section 104.

In order to cause the pressure conditions in the inlet section 104 to closely simulate the pressure conditions that exist when an engine jet is discharging directly into the atmosphere, we provide what may be termed a pressure equalizing passage 125 leading to immediately adjacent the rear extremity of the fuselage 29. A tubular or annular partition 126 is spaced inwardly from the inner surface of the augmenter 110 to leave the pressure equalizing passage 125. The partition 126 extends some distance rearwardly in the augmenter so that the passage 125 is of considerable length to have substantially atmospheric pressure in its rear portion. The partition 126 has an inturned radial lip 128 on its forward end and a somewhat Venturi shaped annular wall 129 is bolted to this lip at 130. The wall 129 converges rearwardly from the lip 128 to an internal diameter approximately the same as the diameter of the jet at that point or plane and then flares or expands rearwardly. The rearwardly flaring portion of the wall 129 projects into the inlet tube section 104 with substantial clearance, the space thus left serving as the rear portion of the exit 124 of the augmenter passage 120. From the foregoing it will be seen that atmospheric air is inducted or drawn in through the passage 125 to mingle with the engine jet within the wall 129, thus providing substantially atmospheric pressure at the rear extremity of the fuselage 29 and the main body of the augmenter air is drawn through the passage 120 into the inlet section 104. The passage 125 operates to prevent the creation of a substantial negative pressure that might otherwise result from the discharge of the engine jet into the inlet tube section 104.

A water spray ring 132 is carried at the reduced diametered region of the wall 129 and has a series of radially inward projecting jets or nozzle tubes 133 of graduated or different lengths. The nozzle tubes 133 serve to introduce streams of water under pressure into the engine jet to assist in cooling the same. When the afterburner of the engine is to be put into operation it is desirable to adjust the augmenter 110 forwardly to bring the water jet ring 132 and the wall 129 into the desired or proper relationship to the tail pipe of the engine. On the other hand, when the afterburner is not to be put into operation, the augmenter 110 may be adjusted some distance rearwardly. The above described hand wheels 117 are operated to effect these adjustments of the augmenter 110. The water manifold or nozzle ring 132 and the reduced diametered portion of the wall 129 are proportioned to rather accurately surround the discharging blast of the engine jet with the augmenter 110 adjusted as just described. Water under pressure is supplied to the nozzle ring 132 by a pipe 134 which leads to a supply pipe 136 which latter pipe also supplies water under pressure to the pipe 108 of the above described nozzle 44. The pipe 134 passes through the flange or wall 122 and the wall 129, as illustrated in Figure 16.

The adaptor for the augmenter 110 includes a metal ring 137 which carries an internal ring 138 of rubber, synthetic rubber, or the like. Blocks or rings 140 of felt, or similar material, are arranged in the resilient ring 138. A covering 141 of felt, or other yielding sealing material, encloses the assembly of the several adaptor rings and slidably engages in the cylindrical opening 123 of the augmenter wall 122. The covering 141 also engages with the aft portion of the fuselage 29. If desired, the covering 141 may be interrupted at the internal side of the adaptor to form a series of pads 142, as illustrated, for contacting the fuselage 29.

Means is provided for yieldingly urging the adaptor forwardly to hold it in proper contact with the fuselage 29, the engagement of the covering 141 in the opening 123 being such that the adaptor may shift relative to the augmenter during operation of the aircraft engine. The means for urging the adaptor forwardly includes circumferentially spaced cables 150 anchored to the metal ring 137 of the adaptor and extending forwardly to pulleys 139. The cables 150 extend from the pulleys 139 to springs 135 anchored to the flange 122. It will be seen that the springs 135 connected with the spaced cables 150 constantly urge the adaptor forwardly against the fuselage or tail pipe portion 29 of the airplane. The augmenter 110 may be adjusted axially of the inlet section 104 as above described to bring the adaptor means into the approximately correct position to cooperate with the fuselage 29, it being easier to adjust the augmenter than it is to shift the entire airplane 12. Stops 160 are carried by rods 161 projecting from the wall 122 and serve to limit forward movement of the adaptor. The augmenter 110 may be shifted or adjusted to bring the nozzle ring 132 to approximately the periphery of the jet blast, or where the blast almost impinges upon the ring 132, with the afterburner in operation or when the afterburner is not in use. The adaptor is movable relative to the augmenter to permit or accommodate such adjustments.

It is to be understood that the sound absorbing or reducing means for the air intake openings 65 of the airplane 12, shown in Figures 1 and 7, may be used in conjunction with the sound reduction equipment illustrated in Figures 8 to 18 inclusive.

The operation of the apparatus illustrated in Figures 1 to 7 inclusive, has already been described in connection with the description of its components. One or more airplanes 12 may be positioned about the main stack structure 10 and arranged so that the adaptors 19 may be adjusted to engage about the tail pipes or fuselage portions 29. Water under pressure is supplied to the nozzle 44 and the manifold 42 so that when the engine jets discharge into the inlet sections 11, the water cools the jets by evaporation and wets the surfaces of the means 17 to effect a final cooling of the jet stream. The means 17 serves to reduce the velocity of the jet stream and the sound absorbing lining of the inlet tube 11 and stack 10 together with the panels 59, 60, 61 and 64 absorb a large proportion of the sound energy or noise. In the operation of the equipment illustrated in Figures 8 to 18 the airplane 12 is positioned with its tail pipe portion at the augmenter means and the augmenter 110 is adjusted as above described so that the sealing adaptor may be brought into contact with the fuselage portion 29. The springs 135 constantly urge the adaptor forwardly against the fuselage portion 29. During the testing or running up of the jet engine, water under pressure is discharged from the nozzle 44 and the jet tubes 133 to cool the engine jet stream by evaporation and water droplets and drops are carried rearwardly to wet the surfaces of the member 47 and cone 48 to effect a final cooling of the jet gases by evaporation. As in the previously described form of the invention, the member 47 and cone 48 constitute an effective barrier for blocking a large proportion of the low velocity sound energy and effectively reduce the velocity of the jet gas stream. The sound absorbing panels 107 and 89 lining the apparatus, as well as the direction changing vanes 93 and the radial panels 94, present a multitude of sound energy reflecting and absorbing surfaces to materially reduce the noise. The engine jet discharging into the apparatus draws or inducts atmospheric air through the passage 120 to discharge into the inlet tube 104 to further reduce the temperature of the jet, provide a boundary layer of air on the surfaces of the tube, and to mingle with the gases of the jet. Atmospheric air is also drawn through the pressure equalizing passage 125 so that the pressure at the extremity of the tail pipe or fuselage portion 29 is substantially the same as or simulates the pressure conditions that would exist if the engine jet were discharging directly into the atmosphere. The air introduced by the passage 125 prevents the creation of any appreciable negative pressure at this region which might interfere with proper airplane engine operation. In both forms of the equipment the major portion of the residual sound energy is discharged or directed upwardly through the stacks 10 and 80 to be dissipated in the atmosphere well above the ground surface so that it does not create an annoyance or nuisance.

It will be apparent that the partition 126 and Venturi-like member 129 may be incorporated in or associated with the augmenter means 36 of the equipment illustrated in Figures 1 to 7 inclusive.

Having described only typical forms of the invention we do not wish to be limited to the specific details herein set forth, but wish to reserve to ourselves any variations and modifications that may appear to those skilled in the art and fall within the scope of the following claims.

We claim:

1. Equipment for reducing the noise produced by the jet discharged from the tail pipe portion of an aircraft jet engine comprising an inlet tube having a forward end for receiving the jet, adaptor means yieldingly connected with the tube for engaging and sealing about said portion, means for admitting atmospheric air into the forward end of the tube, a stack for discharging the jet gases from the rear portion of the tube, and sound absorbing means in the tube and stack.

2. Equipment for reducing the noise produced by the jet discharged from the tail pipe portion of an aircraft jet engine comprising a generally horizontal inlet tube having a forward end for receiving the jet, adaptor means connected with the tube for engaging and sealing about said tail pipe portion, means for admitting atmospheric air into the forward end of the tube, means for introducing water into the forward end portion of the tube to cool the jet stream, a substantially vertical stack for discharging the jet gases from the rear portion of the tube, and sound absorbing means in the tube and stack.

3. Equipment for reducing the noise produced by the jet discharged from the tail pipe portion of an aircraft jet engine comprising a substantially horizontal inlet tube having a forward end for receiving the jet, sealing adaptor means connected with the tube for engaging and sealing about said portion, means for admitting atmospheric air into the forward end of the tube, means for injecting water into the forward portion of the tube to cool the jet gases, a perforated barrier in the tube downstream from the water injecting means for reducing the velocity of the jet and presenting surfaces that are wet by said water, a substantially vertical stack for discharging the jet gases from the rear portion of the tube, and sound absorbing means in the tube and stack.

4. Equipment for reducing the noise produced by the jet discharged from the tail pipe portion of an aircraft jet engine comprising an inlet tube having a forward end for receiving the jet, an augmenter spaced around the forward part of the tube to leave a passage for admitting air into the forward end of the tube and adapted to extend around said tail pipe portion of the engine with clearance to leave a space, an adaptor movably engaging in the augmenter and engageable with said tail pipe portion to close off the space between the augmenter and tail pipe portion, means for yieldingly urging the adaptor into contact with the tail pipe portion, a stack for discharging the gases of the jet from the rear part of the tube, and sound absorbing means in the tube.

5. Equipment for reducing the noise produced by the jet discharged from the tail pipe portion of an aircraft jet engine comprising an inlet tube having a forward end for receiving the jet, an agumenter spaced around the forward part of the tube to leave a passage for admitting air into the forward end of the tube and adapted to be spaced around said tail pipe portion of the engine, an adaptor engaging in the augmenter and engageable with said tail pipe portion to close off the space between the augmenter and the tail pipe portion, partition means in said passage related to the augmenter to define a pressure-equalizing passage for conducting atmospheric pressure to immediately adjacent the end of said tail pipe portion, and sound absorbing means in the tube.

6. Equipment for reducing the noise produced by the jet discharged from the tail pipe portion of an aircraft jet engine comprising an inlet tube having a forward end for receiving the jet, an augmenter spaced around the forward part of the tube to leave a passage for admitting air into the forward end of the tube and adapted to be spaced around said tail pipe portion of the engine, an adaptor movable in the augmenter and engageable with said tail pipe portion to close off the space between the augmenter and the tail pipe portion, means for urging the adaptor against said tail pipe portion, partition means in said passage related to the augmenter to define a pressure equalizing passage for conducting atmospheric pressure to immediately adjacent the end of said tail pipe portion, a Venturi shaped member on the partition means extending rearwardly into the tube, and sound absorbing means in the tube.

7. Equipment for reducing the noise produced by the jet discharged from the tail pipe portion of an aircraft jet engine comprising an inlet tube having a forward end for receiving the jet, an augmenter spaced around the forward part of the tube to leave a passage for admitting air into the forward end of the tube and adapted to engage around the tail pipe portion with clearance to leave a space, an adaptor associated with the augmenter and engaging with said tail pipe portion to close off the space between the tail pipe portion and the augmenter, means for injecting water at circumferentially spaced points at the forward end of the tube to cool the jet, perforated barrier means in the tube for reducing the velocity of the jet, a forwardly directed water injecting nozzle at the barrier means, and a stack for discharging the jet gases from the rear end of the tube.

8. Equipment for reducing the noise produced by the jet discharged from the tail pipe portion of an aircraft jet engine comprising an inlet tube having a forward end for receiving the jet, an augmenter spaced around the forward part of the tube to leave a passage for admitting air into the forward end of the tube and adapted to extend around said tail pipe portion with clearance to leave a space, an adaptor engaged in the augmenter and engageable about said tail pipe portion to close off the space between the tail pipe portion and the augmenter, means for injecting water at circumferentially spaced points at the forward end of the tube to cool the jet, perforated barrier means in the tube for reducing the velocity of the jet, the barrier means including a tubular rearwardly converging perforated baffle, and a conical perforated baffle projecting forwardly in the tubular baffle, a forwardly directed water nozzle at the apex of the conical baffle, and a stack for discharging the jet gases from the rear end of the tube.

9. Equipment for reducing the noise produced by the jets of jet propelled aircraft comprising a stack, a plurality of inlet tubes projecting from the stack for receiving said jets, vanes at the rear ends of the tubes directing the gases of the jets in a circular path into the stack, and circular concentric series of vertical tangentially arranged sound absorbing panels in the stack.

10. Equipment for reducing the noise produced by the jets of aircraft jet engines comprising a stack, a plurality of inlet tubes projecting from the stack for receiving the jets, means for admitting atmospheric air to the tubes to mingle with the jets, means for injecting water into the inlet tubes to cool the jets, sound absorbing means in the tubes, and sound absorbing means in the stack including a substantially circular series of tangentially positioned sound absorbing panels in the stack.

11. A device for reducing the noise created by the jet discharged from the tail pipe of a jet engine including a tubular inlet section having a forward end open for the reception of said jet, a tubular augmenter spaced around the forward portion of the inlet section to leave an annular passage, the rear end of said passage being open to receive atmospheric air and the forward portion of said passage being in communication with the forward end of the inlet section to admit said air thereto, adapter means at the forward end of the augmenter for engaging and sealing about the tail pipe, means for injecting water into the forward portion of the inlet section, and a stack for receiving the jet gases from the rear end of the section.

12. A device for reducing the noise created by the jet discharged from the tail pipe of a jet engine including a generally horizontal inlet tube having an open forward end for receiving the jet, an augmenter spaced around the forward portion of the tube to leave an augmenter passage and extending forwardly beyond the forward end of the tube to surround the tail pipe, a sealing adapter in the forward end of the augmenter for sealing about the tail pipe, the rear end of said passage being open to receive atmospheric air and the forward portion of the passage communicating with the forward end of said tube to deliver said air thereto, an upright stack for receiving the jet gases from the rear end of the tube, and sound absorbing means in the tube and stack.

13. Equipment for reducing the noise produced by the jets discharging from the tail pipes of jet engines comprising an upright stack, a plurality of inlet tubes radiating from the stack and discharging therein, the outer ends of the tubes being open to receive the jets from the tail pipes, a tubular augmenter spaced around the outer portion of each tube to leave an air-receiving augmenter passage therearound and extending beyond said end of the tube to surround the tail pipe, said passages communicating with the outer ends of their respective tubes to supply air thereto, adapter means in the augmenters to seal about the tail pipes, and sound absorbing means in the stack.

14. Equipment for reducing the noise produced by the jets discharging from the tail pipes of jet engines comprising an upright stack, a plurality of inlet tubes radiating from the stack and discharging therein, the outer ends of the tubes being open to receive the jets from the tail pipes, a tubular augmenter spaced around the outer portion of each tube to leave an air-receiving augmenter passage therearound and extending beyond said end of the tube to surround the tail pipe, said passages communicating with the outer ends of their respective tubes to supply air thereto, adapter means in the augmenters to seal about the tail pipes, and sound absorbing means in the stack including at least one circular series of tangentially positioned upright sound absorbing panels in the stack.

15. Equipment for reducing the noise produced by the jets discharging from the tail pipes of jet engines comprising an upright stack, a plurality of inlet tubes radiating from the stack and discharging therein, the outer ends of the tubes being open to receive the jets from the tail pipes, a tubular augmenter spaced around the outer portion of each tube to leave an air-receiving augmenter passage therearound and extending beyond said end of the tube to surround the tail pipe, said passages communicating with the outer ends of their respective tubes to supply air thereto, adapter means in the augmenters to seal about the tail pipes, perforated barriers in the tubes for reducing the velocity of the jets, and sound absorbing means in the stack.

References Cited in the file of this patent

UNITED STATES PATENTS

| Number | Name | Date |
|---|---|---|
| 821,828 | Phelps | May 29, 1906 |
| 1,363,345 | Parsons et al. | Dec. 28, 1920 |
| 1,495,690 | Hayes | May 27, 1924 |
| 1,560,947 | Skelton | Nov. 10, 1925 |
| 1,794,276 | Bowes | Feb. 24, 1931 |
| 1,857,845 | Hamilton | May 10, 1932 |
| 2,363,236 | Fluor | Nov. 21, 1944 |
| 2,365,846 | Seaborne | Dec. 26, 1944 |
| 2,389,059 | Kurth | Nov. 13, 1945 |
| 2,396,952 | Huber | Mar. 19, 1946 |
| 2,455,965 | Wohlberg | Dec. 14, 1948 |
| 2,501,767 | Fluor et al. | Mar. 28, 1950 |
| 2,516,948 | Bourne | Aug. 1, 1950 |
| 2,519,162 | Tucker | Aug. 15, 1950 |
| 2,548,563 | Smith | Apr. 10, 1951 |
| 2,579,282 | Vicard | Dec. 18, 1951 |
| 2,586,788 | Cushman | Feb. 26, 1952 |